US012188477B2

(12) United States Patent
Miwata et al.

(10) Patent No.: US 12,188,477 B2
(45) Date of Patent: Jan. 7, 2025

(54) VACUUM PUMP AND ROTATING CYLINDER PROVIDED IN VACUUM PUMP

(71) Applicant: Edwards Japan Limited, Chiba (JP)

(72) Inventors: Tooru Miwata, Chiba (JP); Yoshiyuki Sakaguchi, Chiba (JP); Yoshiyuki Takai, Chiba (JP); Yasuhiro Shibata, Chiba (JP)

(73) Assignee: Edwards Japan Limited, Chiba (JP)

( * ) Notice: Subject to any disclaimer, the term of this patent is extended or adjusted under 35 U.S.C. 154(b) by 0 days.

(21) Appl. No.: 18/044,815

(22) PCT Filed: Oct. 1, 2021

(86) PCT No.: PCT/JP2021/036488
§ 371 (c)(1),
(2) Date: Mar. 10, 2023

(87) PCT Pub. No.: WO2022/075228
PCT Pub. Date: Apr. 14, 2022

(65) Prior Publication Data

US 2024/0026888 A1 Jan. 25, 2024

(30) Foreign Application Priority Data

Oct. 9, 2020 (JP) ................................ 2020-171094

(51) Int. Cl.
*F04D 19/04* (2006.01)
*F04D 29/32* (2006.01)

(52) U.S. Cl.
CPC ......... *F04D 19/042* (2013.01); *F04D 29/321* (2013.01); *F05D 2250/292* (2013.01)

(58) Field of Classification Search
None
See application file for complete search history.

(56) References Cited

U.S. PATENT DOCUMENTS 4,270,882 A 6/1981 Luijten et al.
6,315,517 B1 * 11/2001 Nonaka ................ F04D 19/044 415/75

(Continued)

FOREIGN PATENT DOCUMENTS

JP H01113191 7/1989
JP H10246197 A 9/1998

(Continued)

OTHER PUBLICATIONS

Japanese Notice of Reasons for Refusal dated Apr. 8, 2024 for corresponding Japanese application Serial No. JP2020-171094, 3 pages.

(Continued)

*Primary Examiner* — Kenneth J Hansen
(74) *Attorney, Agent, or Firm* — Theodore M. Magee; Westman, Champlin & Koehler, P.A.

(57) ABSTRACT

A lower portion of a cylindrical portion provided in a vacuum pump on the outlet port side has an extension portion extending to a further downstream side than a stationary part of a thread groove exhaust element. In the extension portion, the smaller the outer diameter, the smaller the stress applied to the inner diameter side during rotation. As such, the configuration including a reduced diameter portion reduces the stress applied to the inner diameter side of the cylindrical portion without lowering the rotation speed of the rotating body. Additionally, providing a gradually decreasing diameter structure in the extension portion reduces stress concentration at the reduced diameter portion.

4 Claims, 9 Drawing Sheets

(56) References Cited

U.S. PATENT DOCUMENTS

| | | | | |
|---|---|---|---|---|
| 2008/0286089 A1* | 11/2008 | Tsutsui | F04D 29/321 | |
| | | | 415/90 | |
| 2019/0195238 A1* | 6/2019 | Sakaguchi | F04D 3/00 | |

FOREIGN PATENT DOCUMENTS

| | | |
|---|---|---|
| JP | 2000009087 A | 1/2000 |
| JP | 2018035718 A | 3/2018 |
| WO | 2012077411 A1 | 6/2012 |

OTHER PUBLICATIONS

PCT International Search Report dated Dec. 14, 21 for corresponding PCT application Serial No. PCT/JP2021/036488, 2 pages.
PCT International Written Opinion dated Dec. 14, 2021 for corresponding PCT application Serial No. PCT/JP2021/036488, 3 pages.
European Communication dated Sep. 23, 2024 and Supplemental Search Report dated Sep. 10, 2024 for corresponding European application Serial No. 21877527.8, 8 pages.

* cited by examiner

VACUUM PUMP AND ROTATING CYLINDER PROVIDED IN VACUUM PUMP

CROSS-REFERENCE OF RELATED APPLICATION

This application is a Section 371 National Stage Application of International Application No. PCT/JP2021/036488, filed Oct. 1, 2021, which is incorporated by reference in its entirety and published as WO 2022/075228A1 on Apr. 14, 2022 and which claims priority of Japanese Application No. 2020-171094, filed Oct. 9, 2020.

FIELD

The present invention relates to a vacuum pump and a rotating cylinder provided in the vacuum pump, and more particularly to a vacuum pump that reduces stress applied to a rotating cylinder and a rotating cylinder provided in the vacuum pump.

BACKGROUND

Some vacuum pumps installed in vacuum chambers to perform vacuum exhaust processing have rotating bodies and thread groove exhaust elements (thread groove type exhaust mechanisms/thread groove pump portions). A vacuum pump equipped with such a thread groove exhaust element has a rotating cylinder (rotor cylindrical portion), which does not have rotor blades, under a portion of the rotating body having rotor blades, with the rotating cylinder being configured to compress gas in the thread groove exhaust element.

In vacuum pumps that include vacuum pumps having such rotor cylindrical portions, centrifugal force typically applies stress to inner diameter sides of the rotor cylindrical portions, and this stress may exceed the design standard value.

FIG. 9 is a diagram illustrating a conventional turbomolecular pump 100.

As shown in FIG. 9, in the conventional turbomolecular pump 100, a cylindrical portion 102*d* is placed facing a threaded spacer 131 in the radial direction across a clearance. When stress is applied to the cylindrical portion 102*d*, long-term operation at high temperatures causes the cylindrical portion 102*d* to experience creep and gradually deform and/or expand.

A creep life, which is a period before a specified value of the clearance between the threaded spacer 131 and the cylindrical portion 102*d* becomes small due to a creep phenomenon, is preferably long as much as possible from the viewpoint of maintenance costs.

The discussion above is merely provided for general background information and is not intended to be used as an aid in determining the scope of the claimed subject matter. The claimed subject matter is not limited to implementations that solve any or all disadvantages noted in the background.

SUMMARY

Technical Problem

Other than the configuration as described in PTL 1, a technique has been used that lowers a rotation speed of the rotating body (rotor blades/rotating cylinder) to reduce stress.

However, a lower rotation speed of the rotating body results in decreased exhaust performance.

It is an object of the present invention to provide a vacuum pump that is capable of reducing stress without lowering a rotation speed of a rotating cylinder (rotating body) and also improves exhaust performance, and a rotating cylinder provided in the vacuum pump.

Solution to Problem

The present invention provides a vacuum pump including: a casing having an inlet port and an outlet port; a thread groove type exhaust mechanism that is fixed to the casing and includes a thread groove; a rotating shaft that is enclosed and rotationally supported by the casing; and a rotating cylinder disposed on the rotating shaft, the rotating cylinder including an opposed portion facing the thread groove type exhaust mechanism across a clearance and an extension portion extending to a further downstream side than the thread groove type exhaust mechanism, the extension portion including a reduced diameter portion having an outer diameter that is smaller than an outer diameter of the opposed portion and a gradually decreasing diameter structure configured to reduce stress concentration.

The present invention provides the vacuum pump, wherein the gradually decreasing diameter structure is a tapered structure.

The present invention according to claim 3 provides the vacuum pump, wherein the gradually decreasing diameter structure is a curved shape.

The present invention according to claim 4 provides the vacuum pump, wherein the gradually decreasing diameter structure is included in the reduced diameter portion.

The present provides a rotating cylinder of a vacuum pump, wherein the vacuum pump includes: a casing having an inlet port and an outlet port; a thread groove type exhaust mechanism that is fixed to the casing and includes a thread groove; and a rotating shaft that is enclosed and rotationally supported by the casing, the rotating cylinder comprises a rotating cylinder disposed on the rotating shaft, the rotating cylinder is disposed on the rotating shaft, the rotating cylinder includes an opposed portion facing the thread groove type exhaust mechanism across a clearance and an extension portion extending to a further downstream side than the thread groove type exhaust mechanism, the extension portion including a reduced diameter portion having an outer diameter that is smaller than an outer diameter of the opposed portion and a gradually decreasing diameter structure configured to reduce stress concentration.

Advantageous Effects of Invention

According to the present invention, the stress in the portion of the rotating cylinder that accounts for the creep life is reduced. Accordingly, the exhaust performance is maintained or improved as compared to a configuration that is designed to lower the rotation speed in order to reduce the stress.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

DETAILED DESCRIPTION (i) Outline of Embodiments

In the turbomolecular pump (vacuum pump) according to an embodiment of the present invention, the lower portion of the cylindrical portion (rotating cylinder) of the turbomolecular pump on the outlet port side has an extension portion extending to a further downstream side than the stationary part of the thread groove exhaust element. The extension portion includes a reduced diameter portion.

More specifically, the lower end portion (outlet port side end portion) of the cylindrical portion is designed to be longer than the thread groove exhaust element to form the extension portion. The extension portion of the rotor cylindrical portion has the reduced diameter portion having a smaller outer diameter than the portion that is located on the inlet port side of the rotor cylindrical portion and faces the thread groove exhaust element (opposed portion). Additionally, the extension portion has a gradually decreasing diameter structure. This gradually decreasing diameter structure refers to a structure having a diameter that gradually decreases.

In the extension portion, the smaller the outer diameter, the smaller the stress applied to the inner diameter side during rotation. As such, the configuration including the reduced diameter portion and the gradually decreasing diameter structure described above reduces the stress applied to the inner diameter side of the cylindrical portion without lowering the rotation speed of the rotating body (such as the cylindrical portion).

(ii) Details of Embodiments

Referring to FIGS. 1 to 8B, preferred embodiments of the present invention are now described in detail.

Figure 1:
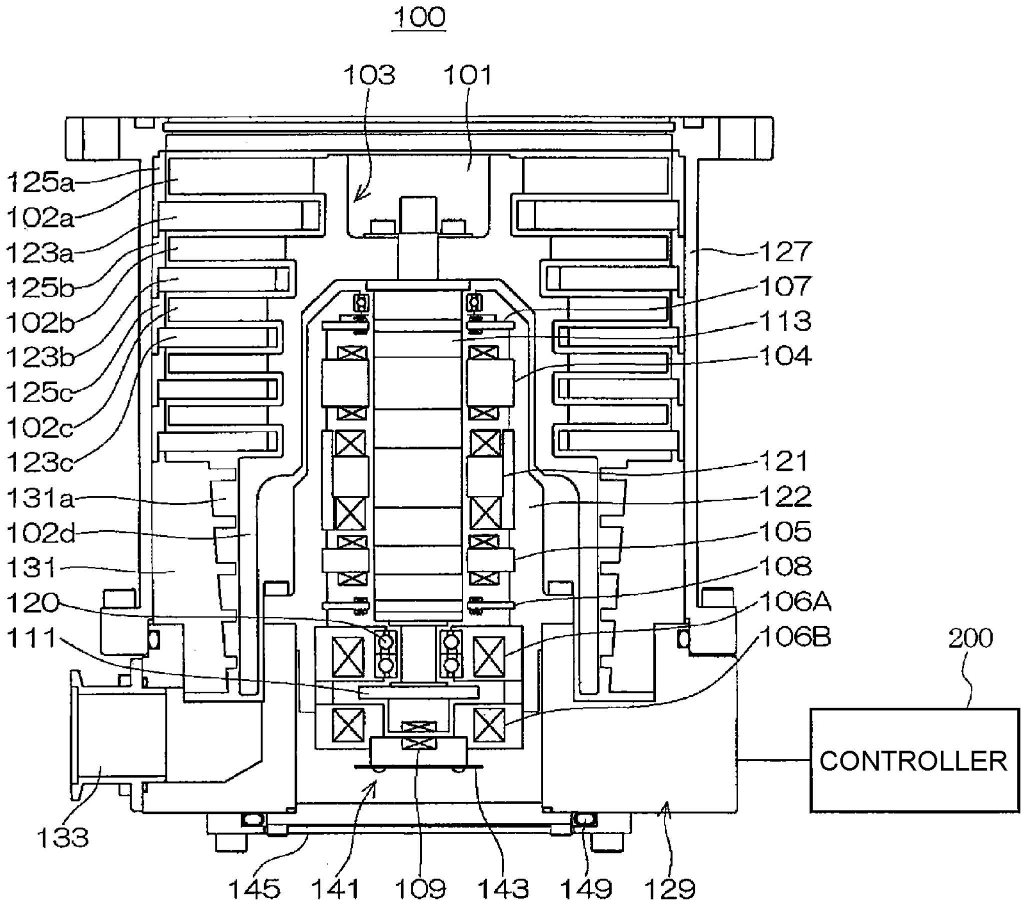
FIG. 1 is a schematic diagram showing an example of the configuration of a turbomolecular pump of an embodiment according to the present invention.

FIG. 1 is a vertical cross-sectional view of the turbomolecular pump 100. As shown in FIG. 1, the turbomolecular pump 100 has a circular outer cylinder 127 having an inlet port 101 at its upper end. A rotating body 103 in the outer cylinder 127 includes a plurality of rotor blades 102 (102*a*, 102*b*, 102*c*, . . . ), which are turbine blades for gas suction and exhaustion, in its outer circumference section. The rotor blades 102 extend radially in multiple stages. The rotating body 103 has a rotor shaft 113 in its center. The rotor shaft 113 is suspended in the air and position-controlled by a magnetic bearing of 5-axis control, for example.

Upper radial electromagnets 104 include four electromagnets arranged in pairs on an X-axis and a Y-axis. Four upper radial sensors 107 are provided in close proximity to the upper radial electromagnets 104 and associated with the respective upper radial electromagnets 104. Each upper radial sensor 107 may be an inductance sensor or an eddy current sensor having a conduction winding, for example, and detects the position of the rotor shaft 113 based on a change in the inductance of the conduction winding, which changes according to the position of the rotor shaft 113. The upper radial sensors 107 are configured to detect a radial displacement of the rotor shaft 113, that is, the rotating body 103 fixed to the rotor shaft 113, and send it to the controller 200.

In the controller 200, for example, a compensation circuit having a PID adjustment function generates an excitation control command signal for the upper radial electromagnets 104 based on a position signal detected by the upper radial sensors 107. Based on this excitation control command signal, an amplifier circuit 150 (described below) shown in FIG. 2 controls and excites the upper radial electromagnets 104 to adjust a radial position of an upper part of the rotor shaft 113.

The rotor shaft 113 may be made of a high magnetic permeability material (such as iron and stainless steel) and is configured to be attracted by magnetic forces of the upper radial electromagnets 104. The adjustment is performed independently in the X-axis direction and the Y-axis direction. Lower radial electromagnets 105 and lower radial sensors 108 are arranged in a similar manner as the upper radial electromagnets 104 and the upper radial sensors 107 to adjust the radial position of the lower part of the rotor shaft 113 in a similar manner as the radial position of the upper part.

Additionally, axial electromagnets 106A and 106B are arranged so as to vertically sandwich a metal disc 111, which has a shape of a circular disc and is provided in the lower part of the rotor shaft 113. The metal disc 111 is made of a high magnetic permeability material such as iron. An axial sensor 109 is provided to detect an axial displacement of the rotor shaft 113 and send an axial position signal to the controller 200.

In the controller 200, the compensation circuit having the PID adjustment function may generate an excitation control command signal for each of the axial electromagnets 106A and 106B based on the signal on the axial position detected by the axial sensor 109. Based on these excitation control command signals, the amplifier circuit 150 controls and excites the axial electromagnets 106A and 106B separately so that the axial electromagnet 106A magnetically attracts the metal disc 111 upward and the axial electromagnet 106B attracts the metal disc 111 downward. The axial position of the rotor shaft 113 is thus adjusted.

As described above, the controller 200 appropriately adjusts the magnetic forces exerted by the axial electromagnets 106A and 106B on the metal disc 111, magnetically levitates the rotor shaft 113 in the axial direction, and suspends the rotor shaft 113 in the air in a non-contact manner. The amplifier circuit 150, which controls and excites the upper radial electromagnets 104, the lower radial electromagnets 105, and the axial electromagnets 106A and 106B, is described below.

The motor 121 includes a plurality of magnetic poles circumferentially arranged to surround the rotor shaft 113. Each magnetic pole is controlled by the controller 200 so as to drive and rotate the rotor shaft 113 via an electromagnetic force acting between the magnetic pole and the rotor shaft 113. The motor 121 also includes a rotational speed sensor (not shown), such as a Hall element, a resolver, or an encoder, and the rotational speed of the rotor shaft 113 is detected based on a detection signal of the rotational speed sensor.

Furthermore, a phase sensor (not shown) is attached adjacent to the lower radial sensors 108 to detect the phase of rotation of the rotor shaft 113. The controller 200 detects the position of the magnetic poles using both detection signals of the phase sensor and the rotational speed sensor.

A plurality of stator blades 123 (123*a*, 123*b*, 123*c*, . . . ) are arranged slightly spaced apart from the rotor blades 102 (102*a*, 102*b*, 102*c*, . . . ). Each rotor blade 102 (102*a*, 102*b*, 102*c*, . . . ) is inclined by a predetermined angle from a plane perpendicular to the axis of the rotor shaft 113 in order to transfer exhaust gas molecules downward through collision.

The stator blades 123 are also inclined by a predetermined angle from a plane perpendicular to the axis of the rotor shaft 113. The stator blades 123 extend inward of the outer cylinder 127 and alternate with the stages of the rotor blades 102. The outer circumference ends of the stator blades 123 are inserted between and thus supported by a plurality of layered stator blade spacers 125 (125*a*, 125*b*, 125*c*, . . . ).

The stator blade spacers 125 are ring-shaped members made of a metal, such as aluminum, iron, stainless steel, or copper, or an alloy containing these metals as components, for example. The outer cylinder 127 is fixed to the outer circumferences of the stator blade spacers 125 with a slight gap. A base portion 129 is located at the base of the outer cylinder 127. The base portion 129 has an outlet port 133 providing communication to the outside. The exhaust gas transferred to the base portion 129 through the inlet port 101 from the chamber is then sent to the outlet port 133.

According to the application of the turbomolecular pump 100, a threaded spacer 131 may be provided between the lower part of the stator blade spacer 125 and the base portion 129. The threaded spacer 131 is a cylindrical member made of a metal such as aluminum, copper, stainless steel, or iron, or an alloy containing these metals as components. The threaded spacer 131 has a plurality of helical thread grooves 131*a* in its inner circumference surface. When exhaust gas molecules move in the rotation direction of the rotating body 103, these molecules are transferred toward the outlet port 133 in the direction of the helix of the thread grooves 131*a*. In the lowermost section of the rotating body 103 below the rotor blades 102 (102*a*, 102*b*, 102*c*, . . . ), a cylindrical portion 102*d* extends downward. The outer circumference surface of the cylindrical portion 102*d* is cylindrical and projects toward the inner circumference surface of the threaded spacer 131. The outer circumference surface is adjacent to but separated from the inner circumference surface of the threaded spacer 131 by a predetermined gap. The exhaust gas transferred to the thread grooves 131*a* by the rotor blades 102 and the stator blades 123 is guided by the thread grooves 131*a* to the base portion 129.

The base portion 129 is a disc-shaped member forming the base section of the turbomolecular pump 100, and is generally made of a metal such as iron, aluminum, or stainless steel. The base portion 129 physically holds the turbomolecular pump 100 and also serves as a heat conduction path. As such, the base portion 129 is preferably made of rigid metal with high thermal conductivity, such as iron, aluminum, or copper.

In this configuration, when the motor 121 drives and rotates the rotor blades 102 together with the rotor shaft 113, the interaction between the rotor blades 102 and the stator blades 123 causes the suction of exhaust gas from the chamber through the inlet port 101. The exhaust gas taken through the inlet port 101 moves between the rotor blades 102 and the stator blades 123 and is transferred to the base portion 129. At this time, factors such as the friction heat generated when the exhaust gas comes into contact with the rotor blades 102 and the conduction of heat generated by the motor 121 increase the temperature of the rotor blades 102. This heat is conducted to the stator blades 123 through radiation or conduction via gas molecules of the exhaust gas, for example.

The stator blade spacers 125 are joined to each other at the outer circumference portion and conduct the heat received by the stator blades 123 from the rotor blades 102, the friction heat generated when the exhaust gas comes into contact with the stator blades 123, and the like to the outside.

In the above description, the threaded spacer 131 is provided at the outer circumference of the cylindrical portion 102*d* of the rotating body 103, and the thread grooves 131*a* are engraved in the inner circumference surface of the threaded spacer 131. However, this may be inversed in some cases, and a thread groove may be engraved in the outer circumference surface of the cylindrical portion 102*d*, while a spacer having a cylindrical inner circumference surface may be arranged around the outer circumference surface.

According to the application of the turbomolecular pump 100, to prevent the gas drawn through the inlet port 101 from entering an electrical portion, which includes the upper radial electromagnets 104, the upper radial sensors 107, the motor 121, the lower radial electromagnets 105, the lower radial sensors 108, the axial electromagnets 106A, 106B, and the axial sensor 109, the electrical portion may be surrounded by a stator column 122. The inside of the stator column 122 may be maintained at a predetermined pressure by purge gas.

In this case, the base portion 129 has a pipe (not shown) through which the purge gas is introduced. The introduced purge gas is sent to the outlet port 133 through gaps between a protective bearing 120 and the rotor shaft 113, between the rotor and the stator of the motor 121, and between the stator column 122 and the inner circumference cylindrical portion of the rotor blade 102.

The turbomolecular pump 100 requires the identification of the model and control based on individually adjusted unique parameters (for example, various characteristics associated with the model). To store these control parameters, the turbomolecular pump 100 includes an electronic circuit portion 141 in its main body. The electronic circuit portion 141 may include a semiconductor memory, such as an EEPROM, electronic components such as semiconductor elements for accessing the semiconductor memory, and a substrate 143 for mounting these components. The electronic circuit portion 141 is housed under a rotational speed sensor (not shown) near the center, for example, of the base portion 129, which forms the lower part of the turbomolecular pump 100, and is closed by an airtight bottom lid 145. Some process gas introduced into the chamber in the manufacturing process of semiconductors has the property of becoming solid when its pressure becomes higher than a predetermined value or its temperature becomes lower than a predetermined value. In the turbomolecular pump 100, the pressure of the exhaust gas is lowest at the inlet port 101 and highest at the outlet port 133. When the pressure of the process gas increases beyond a predetermined value or its temperature decreases below a predetermined value while the process gas is being transferred from the inlet port 101 to the outlet port 133, the process gas is solidified and adheres and accumulates on the inner side of the turbomolecular pump 100.

For example, when $SiCl_4$ is used as the process gas in an Al etching apparatus, according to the vapor pressure curve, a solid product (for example, $AlCl_3$) is deposited at a low vacuum (760 [torr] to $10^{-2}$ [torr]) and a low temperature (about 20 [° C.]) and adheres and accumulates on the inner side of the turbomolecular pump 100. When the deposit of the process gas accumulates in the turbomolecular pump 100, the accumulation may narrow the pump flow passage and degrade the performance of the turbomolecular pump 100. The above-mentioned product tends to solidify and adhere in areas with higher pressures, such as the vicinity of the outlet port 133 and the vicinity of the threaded spacer 131.

To solve this problem, conventionally, a heater or annular water-cooled tube 149 (not shown) is wound around the outer circumference of the base portion 129, and a temperature sensor (e.g., a thermistor, not shown) is embedded in the base portion 129, for example. The signal of this temperature sensor is used to perform control to maintain the temperature of the base portion 129 at a constant high temperature (preset temperature) by heating with the heater or cooling with the water-cooled tube 149 (hereinafter referred to as TMS (temperature management system)).

Figure 2:
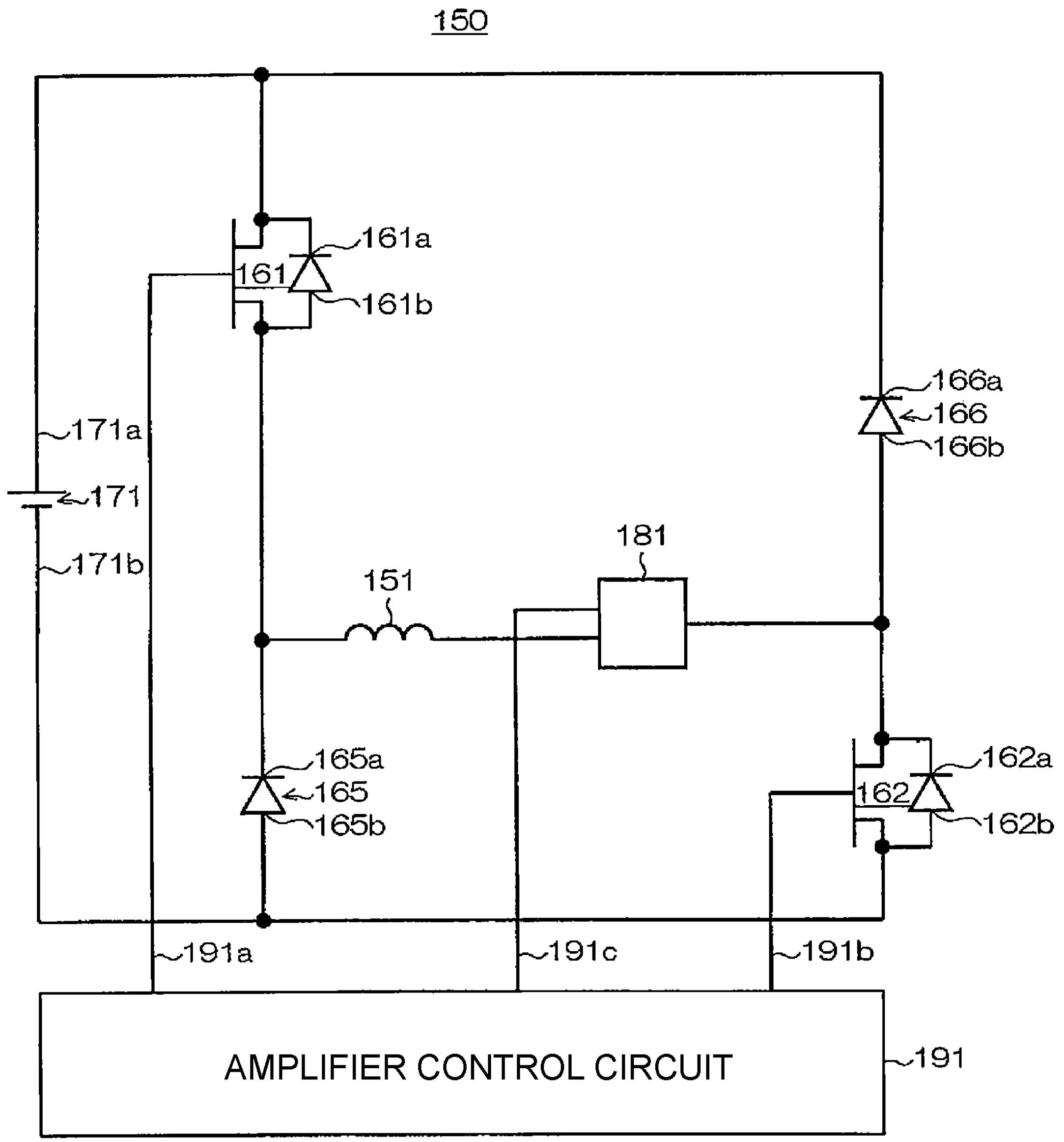
FIG. 2 is a circuit diagram of an amplifier circuit used in an embodiment of the present invention.

The amplifier circuit 150 is now described that controls and excites the upper radial electromagnets 104, the lower radial electromagnets 105, and the axial electromagnets 106A and 106B of the turbomolecular pump 100 configured as described above. FIG. 2 is a circuit diagram of the amplifier circuit 150.

In FIG. 2, one end of an electromagnet winding 151 forming an upper radial electromagnet 104 or the like is connected to a positive electrode 171*a* of a power supply 171 via a transistor 161, and the other end is connected to a negative electrode 171*b* of the power supply 171 via a current detection circuit 181 and a transistor 162. Each transistor 161, 162 is a power MOSFET and has a structure in which a diode is connected between the source and the drain thereof.

In the transistor 161, a cathode terminal 161*a* of its diode is connected to the positive electrode 171*a*, and an anode terminal 161*b* is connected to one end of the electromagnet winding 151. In the transistor 162, a cathode terminal 162*a* of its diode is connected to a current detection circuit 181, and an anode terminal 162*b* is connected to the negative electrode 171*b*.

A diode 165 for current regeneration has a cathode terminal 165*a* connected to one end of the electromagnet winding 151 and an anode terminal 165*b* connected to the negative electrode 171*b*. Similarly, a diode 166 for current regeneration has a cathode terminal 166*a* connected to the positive electrode 171*a* and an anode terminal 166*b* connected to the other end of the electromagnet winding 151 via the current detection circuit 181. The current detection circuit 181 may include a Hall current sensor or an electric resistance element, for example.

The amplifier circuit 150 configured as described above corresponds to one electromagnet. Accordingly, when the magnetic bearing uses 5-axis control and has ten electromagnets 104, 105, 106A, and 106B in total, an identical amplifier circuit 150 is configured for each of the electromagnets. These ten amplifier circuits 150 are connected to the power supply 171 in parallel.

An amplifier control circuit 191 may be formed by a digital signal processor portion (not shown, hereinafter referred to as a DSP portion) of the controller 200. The amplifier control circuit 191 switches the transistors 161 and 162 between on and off.

The amplifier control circuit 191 is configured to compare a current value detected by the current detection circuit 181 (a signal reflecting this current value is referred to as a current detection signal 191*c*) with a predetermined current command value. The result of this comparison is used to determine the magnitude of the pulse width (pulse width time Tp1, Tp2) generated in a control cycle Ts, which is one cycle in PWM control. As a result, gate drive signals 191*a* and 191*b* having this pulse width are output from the amplifier control circuit 191 to gate terminals of the transistors 161 and 162.

Under certain circumstances such as when the rotational speed of the rotating body 103 reaches a resonance point during acceleration, or when a disturbance occurs during a constant speed operation, the rotating body 103 may require positional control at high speed and with a strong force. For this purpose, a high voltage of about 50 V, for example, is used for the power supply 171 to enable a rapid increase (or decrease) in the current flowing through the electromagnet winding 151. Additionally, a capacitor is generally connected between the positive electrode 171*a* and the negative electrode 171*b* of the power supply 171 to stabilize the power supply 171 (not shown).

In this configuration, when both transistors 161 and 162 are turned on, the current flowing through the electromagnet winding 151 (hereinafter referred to as an electromagnet current iL) increases, and when both are turned off, the electromagnet current iL decreases.

Also, when one of the transistors 161 and 162 is turned on and the other is turned off, a freewheeling current is maintained. Passing the freewheeling current through the amplifier circuit 150 in this manner reduces the hysteresis loss in the amplifier circuit 150, thereby limiting the power consumption of the entire circuit to a low level. Moreover, by controlling the transistors 161 and 162 as described above, high frequency noise, such as harmonics, generated in the turbomolecular pump 100 can be reduced. Furthermore, by measuring this freewheeling current with the current detection circuit 181, the electromagnet current iL flowing through the electromagnet winding 151 can be detected.

Figure 3:
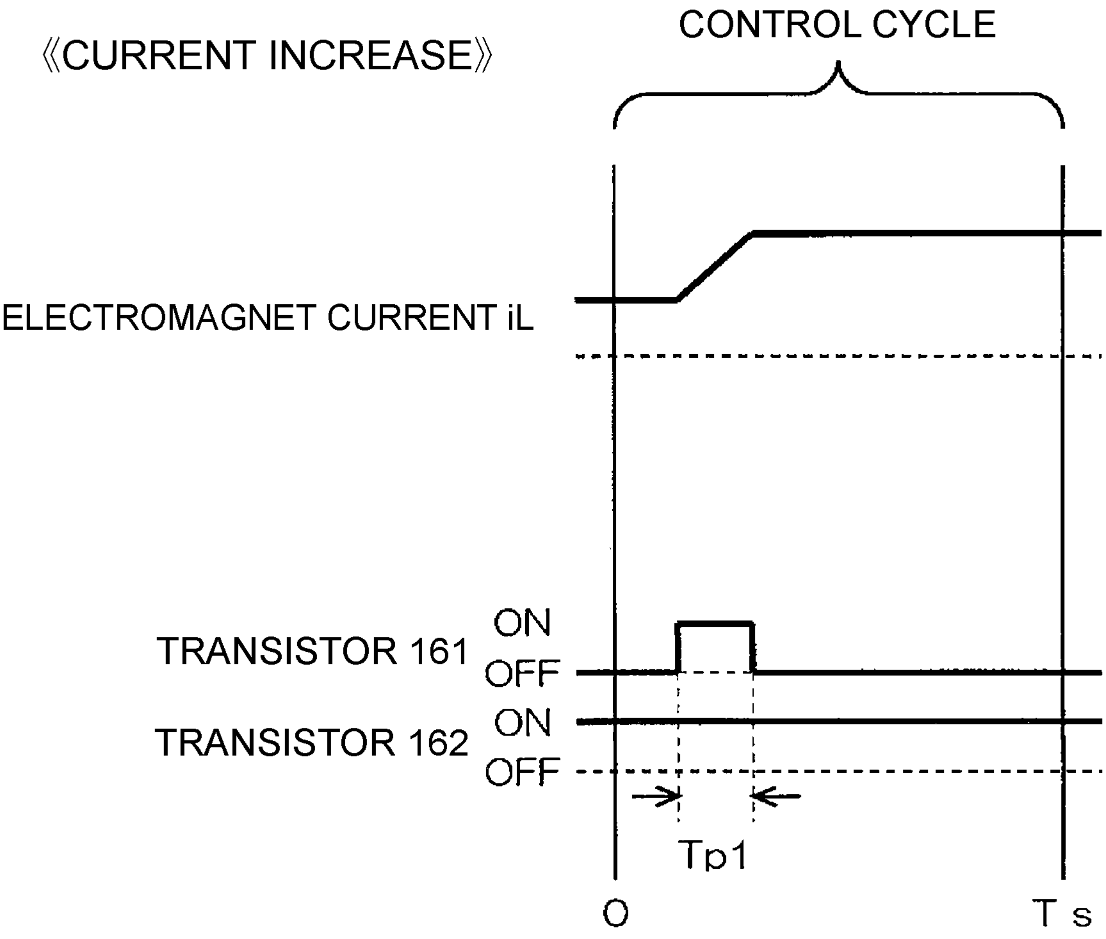
FIG. 3 is a time chart showing control performed when a current command value is greater than a detected value in an embodiment of the present invention.

That is, when the detected current value is smaller than the current command value, as shown in FIG. 3, the transistors 161 and 162 are simultaneously on only once in the control cycle Ts (for example, 100 μs) for the time corresponding to the pulse width time Tp1. During this time, the electromagnet current iL increases accordingly toward the current value iLmax (not shown) that can be passed from the positive electrode 171*a* to the negative electrode 171*b* via the transistors 161 and 162.

Figure 4:
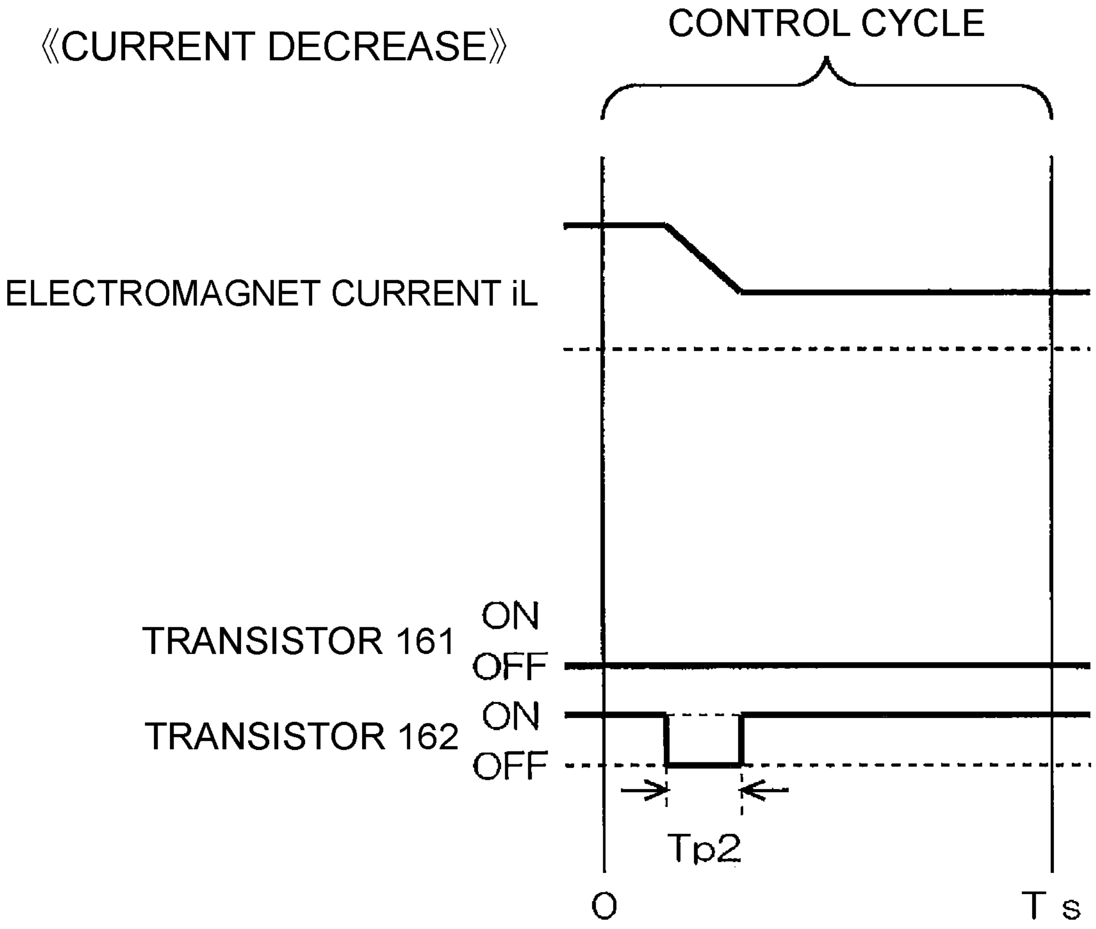
FIG. 4 is a time chart showing control performed when a current command value is less than a detected value in an embodiment of the present invention.

When the detected current value is larger than the current command value, as shown in FIG. 4, the transistors 161 and 162 are simultaneously off only once in the control cycle Ts for the time corresponding to the pulse width time Tp2. During this time, the electromagnet current iL decreases accordingly toward the current value iLmin (not shown) that can be regenerated from the negative electrode 171*b* to the positive electrode 171*a* via the diodes 165 and 166.

In either case, after the pulse width time Tp1, Tp2 has elapsed, one of the transistors 161 and 162 is on. During this period, the freewheeling current is thus maintained in the amplifier circuit 150.

Figure 5:
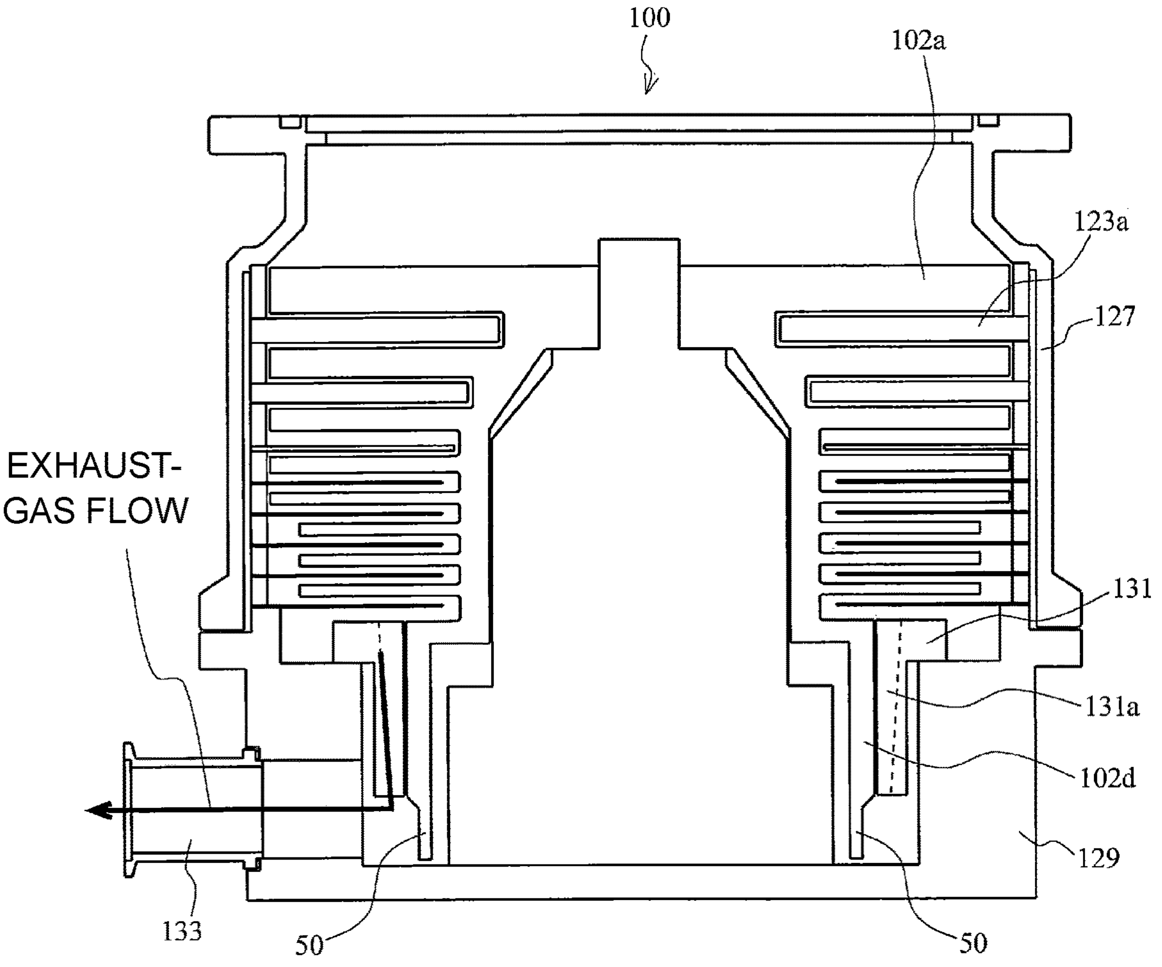
FIG. 5 is a schematic diagram showing an example of the configuration of a turbomolecular pump according to a first embodiment of the present invention.

FIG. 5 is a diagram illustrating the outline of a turbomolecular pump 100 according to the first embodiment.

Figure 6:
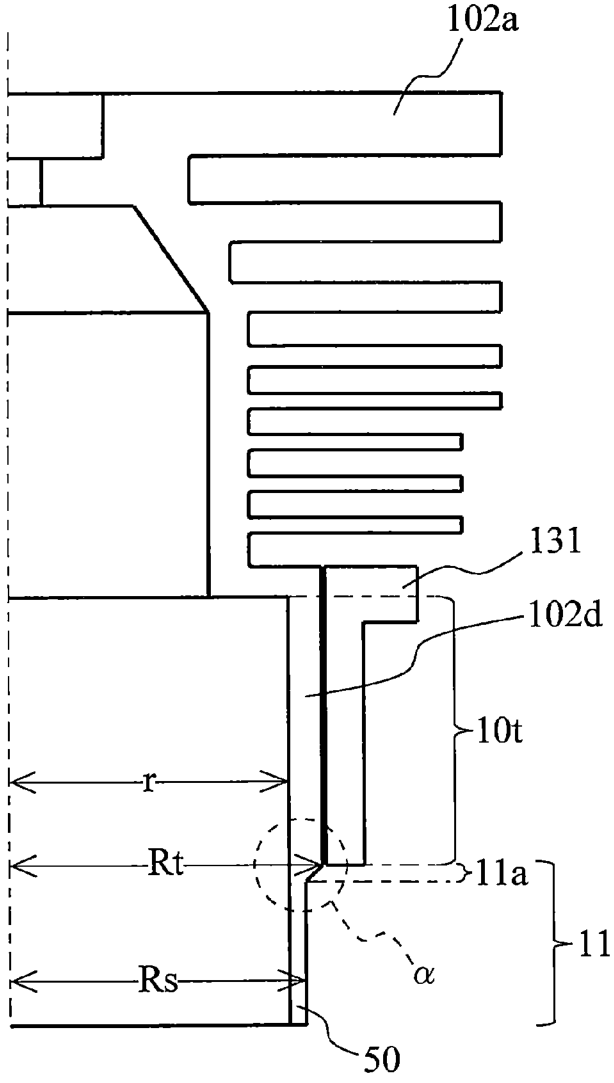
FIG. 6 is a diagram illustrating a cylindrical portion and an extension portion of the turbomolecular pump according to the first embodiment of the present invention.

FIG. 6 is a diagram illustrating an opposed portion 10*t* and an extension portion 11 (a gradually decreasing diameter structure 11*a* and a reduced diameter portion 50) of a cylindrical portion 102*d* of the turbomolecular pump 100 shown in FIG. 5.

Figure 7:
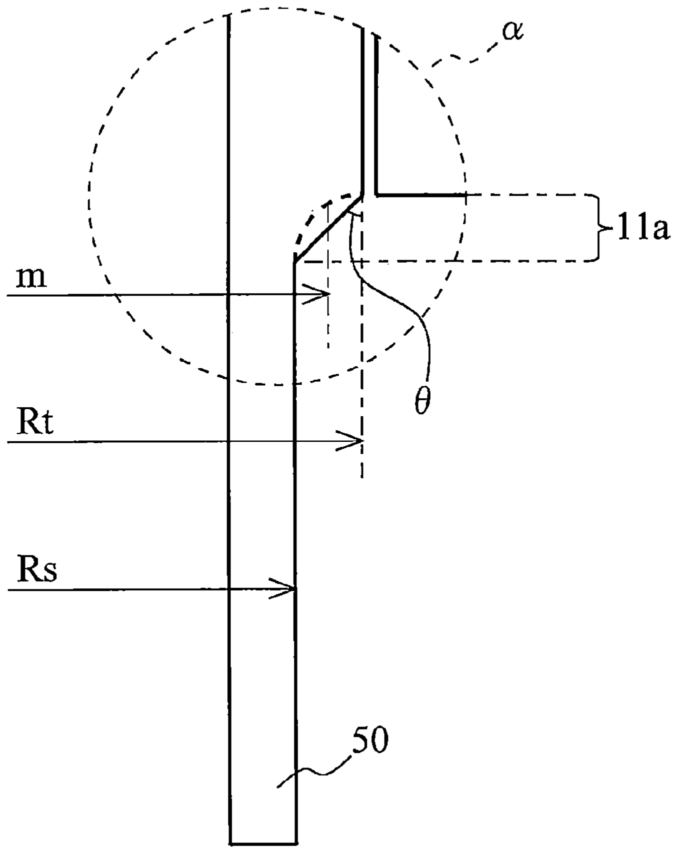
FIG. 7 is an enlarged view of the cylindrical portion and the extension portion shown in FIG. 6.

FIG. 7 is an enlarged view of the opposed portion 10*t*, the extension portion 11, the gradually decreasing diameter structure 11*a*, and the reduced diameter portion 50 in the cylindrical portion 102*d*.

As shown in FIGS. 5 to 7, the cylindrical portion 102*d* includes the opposed portion 10*t*, which faces the threaded spacer 131 in the radial direction with a predetermined clearance therebetween, the extension portion 11, which extends toward the outlet port 133 beyond the threaded spacer 131, the gradually decreasing diameter structure 11*a*, and the reduced diameter portion 50. The shape of the reduced diameter portion 50 is cylindrical as with the cylindrical portion 102*d*.

As is clear from FIG. 6, the extension portion 11 consists of the gradually decreasing diameter structure 11*a* and the reduced diameter portion 50.

In the present embodiment, "r" denotes the inner diameter of the opposed portion of the cylindrical portion 102*d*, and "Rt" denotes its outer diameter.

Additionally, as shown in FIG. 7, "Rs" denotes the outer diameter of the lower end (the end closer to the outlet port 133) of the gradually decreasing diameter structure 11*a* and the reduced diameter portion 50, and "m" denotes the gradually changing outer diameter of the gradually decreasing diameter structure 11*a*. As used in this embodiment, the "gradually changing outer diameter" refers to an "outer diameter that gradually changes".

In the cylindrical portion 102*d* of the turbomolecular pump 100 according to the present embodiment, the extension portion 11, which extends toward the outlet port 133 beyond the threaded spacer 131, has the gradually decreasing diameter structure 11*a*, which has the gradually changing outer diameter m that is smaller than the outer diameter Rt of the portion of the cylindrical portion 102*d* (the opposed portion 10*t*) other than the extension portion 11. In the embodiment shown in FIGS. 5 to 7, the gradually changing outer diameter m gradually decreases in value from the inlet port side to the outlet port side (that is, the outer diameter gradually changes).

In other words, the cylindrical portion 102*d* according to the present embodiment has a portion having a gradient of a predetermined angle θ (gradually decreasing diameter structure 11*a*) on the outer diameter side of the extension portion 11. This gradient may be formed, for example, by tapering the outer diameter side of the extension portion 11.

The present embodiment has the configuration in which the starting point (point of origin) of the extension portion 11 coincides with the starting point of the gradually decreasing diameter structure 11*a*. However, the present invention is not limited to this. That is, in the extension portion 11 extending from the opposed portion 10*t*, a portion at the side corresponding to the inlet port 101 may have the same outer diameter Rt as the opposed portion 10*t*, and the gradually decreasing diameter structure 11*a* having the gradually changing outer diameter m that decreases gradually may be provided next to the above portion. That is, the gradually decreasing diameter structure 11*a* may be formed in at least a portion of the extension portion 11.

In the present embodiment, the outer diameter Rs of the lower end (the end closer to the outlet port 133) of the extension portion 11 is equal in value to the gradually changing outer diameter m of the lowest end (the end closer to the outlet port 133) of the gradually decreasing diameter structure 11*a*. However, the present invention is not limited to this. That is, the value of the gradually changing outer diameter m of the lowest end of the gradually decreasing diameter structure 11*a* may be equal to the value of the inner diameter r of the opposed portion 10*t*.

The extension portion 11 functions to reduce the stress applied to the lower end portion of the cylindrical portion 102*d*. In terms of stress reduction, providing the reduced diameter portion 50 and the gradually decreasing diameter structure 11*a* further reduces the stress.

For this reason, within the bounds of dimensional restrictions, the extension portion 11 is provided that is formed by the reduced diameter portion 50 and the gradually decreasing diameter structure 11*a*.

Figure 8A:
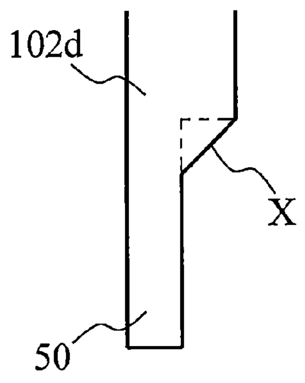
FIGS. 8A and 8B are diagrams illustrating the shape of the extension portion.
Figure 8B:
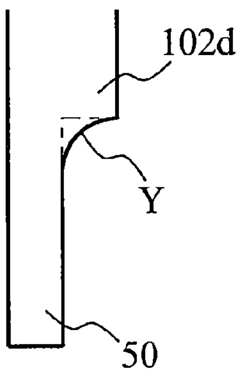
Figure 9:
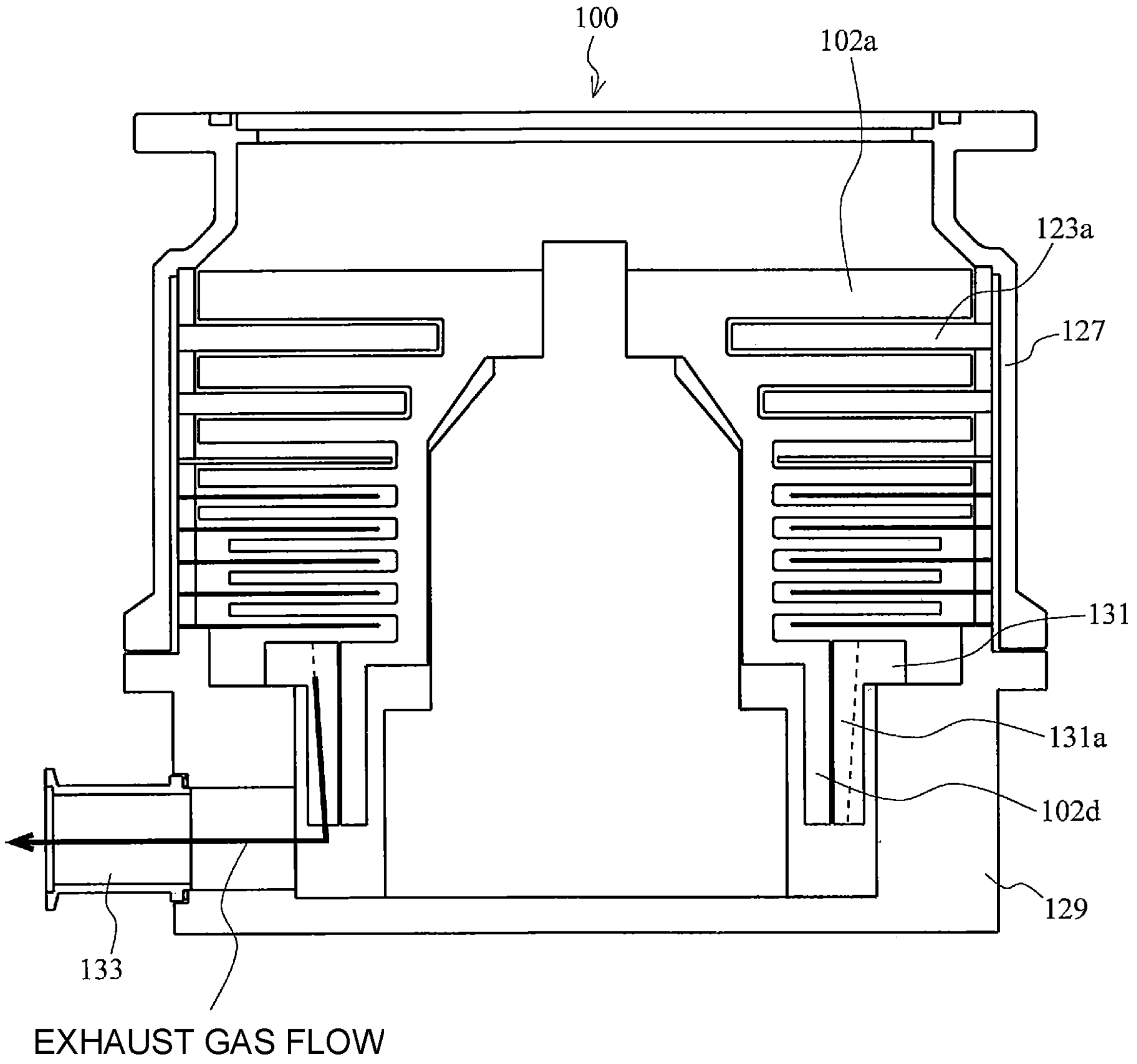
FIG. 9 is a schematic view showing an example of the configuration of a conventional turbomolecular pump.

FIGS. 8A and 8B are diagrams showing forms of connection between the reduced diameter portion 50 and the gradually decreasing diameter structure 11*a*.

Since stress tends to concentrate at the section where the gradually decreasing diameter structure 11*a* is connected to the reduced diameter portion 50, this section preferably has a structure that reduces the likelihood of stress concentration.

In FIG. 8A, a tapered structure X is adopted as the gradually decreasing diameter structure 11*a*. In FIG. 8B, a rounded-corner shape Y is adopted as the gradually decreasing diameter structure 11*a*.

Other than the structures shown in FIGS. 8A and 8B, the present embodiment may use any structure that can reduce stress concentration.

In the present embodiment, the gradient of the gradually decreasing diameter structure 11*a* is linear as viewed in a cross-section, but the present invention is not limited to this. For example, although not shown, the gradient of the gradually decreasing diameter structure 11*a* may be curved as viewed in a cross-section.

The present embodiment having the above configuration can reduce the stress applied to the inner diameter side of the gradually decreasing diameter structure 11*a*, which accounts for the creep life of the cylindrical portion 102*d*, without lowering the rotation speed of the rotating body including the cylindrical portion 102*d*.

Moreover, since the prevention of creep is achieved without lowering the rotation speed, a reduction in the exhaust performance of the turbomolecular pump 100, which would otherwise occur due to a lowered rotation speed, is prevented.

Alternatively, this configuration allows the rotation speed of the rotor portion including the cylindrical portion 102*d* to be higher, thereby improving the exhaust performance of the turbomolecular pump 100.

The reduced diameter portion 50 described above has a uniform outer diameter Rs. However, the present invention is not limited to this, and the outer diameter Rs may decrease toward the lower end.

Although the reduced diameter portion 50 and the gradually decreasing diameter structure 11*a* have been described separately, they may be configured to be integral, or each of them may be configured as a gradually decreasing diameter structure having an outer diameter that gradually changes toward the lower end.

The embodiments and modifications of the present invention may be combined as necessary.

Also, the invention is amenable to various modifications without departing from the spirit of the invention. The invention is, of course, intended to cover all modifications.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A vacuum pump comprising:

a casing having an inlet port and an outlet port;

a threaded spacer that is fixed to the casing and includes a thread groove;

a rotating shaft that is enclosed and rotationally supported by the casing; and a rotating cylinder disposed on the rotating shaft, the rotating cylinder including an opposed portion facing the threaded spacer across a clearance and an extension portion extending to a further downstream side than the threaded spacer, wherein the extension portion includes: a gradually decreasing diameter structure having an outer diameter that decreases from the inlet port toward the outlet port; and a reduced diameter portion having an outer diameter that is smaller than an outer diameter of the opposed portion, the reduced diameter portion being disposed on a side of the outlet port with respect to the gradually decreasing diameter structure.

2. The vacuum pump according to claim 1, wherein the gradually decreasing diameter structure is a tapered structure.

3. The vacuum pump according to claim 1, wherein the gradually decreasing diameter structure is a curved shape.

4. A rotating cylinder of a vacuum pump, wherein the vacuum pump includes:

a casing having an inlet port and an outlet port;

a threaded spacer that is fixed to the casing and includes a thread groove; and a rotating shaft that is enclosed and rotationally supported by the casing, the rotating cylinder is disposed on the rotating shaft, the rotating cylinder comprises an opposed portion facing the threaded spacer across a clearance and an extension portion extending to a further downstream side than the threaded spacer, wherein the extension portion includes a gradually decreasing diameter structure having an outer diameter that decreases from the inlet port toward the outlet port; and a reduced diameter portion having an outer diameter that is smaller than an outer diameter of the opposed portion, the reduced diameter portion being disposed on a side of the outlet port with respect to the gradually decreasing diameter structure.

* * * * *